Dec. 18, 1951  W. R. POLYE  2,579,271
TEMPERATURE PROBE
Filed Dec. 3, 1948
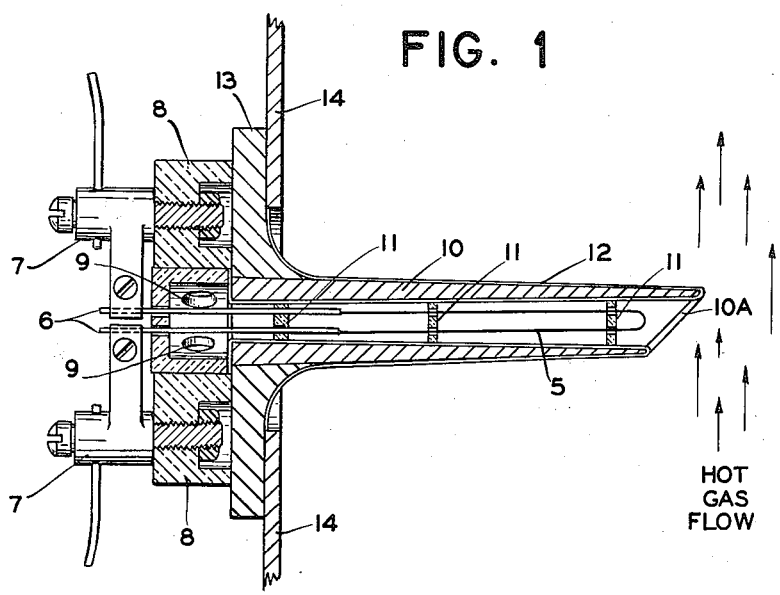
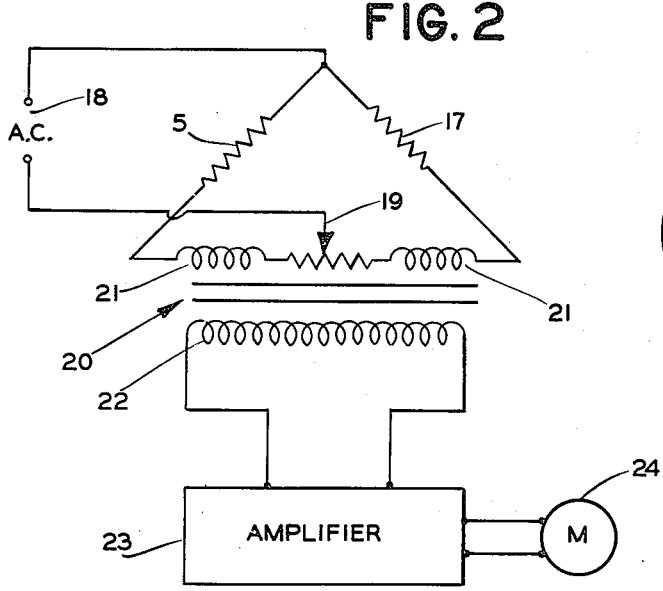
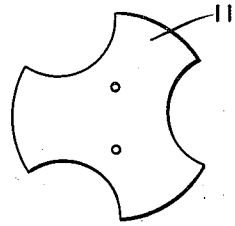
INVENTOR.
WILLIAM R. POLYE
BY Stephen Cerstvik
HIS ATTORNEY Patented Dec. 18, 1951

2,579,271

UNITED STATES PATENT OFFICE 2,579,271

TEMPERATURE PROBE

William R. Polye, River Edge, N. J., assignor to Bendix Aviation Corporation, Teterboro, N. J., a corporation of Delaware Application December 3, 1948, Serial No. 63,381

8 Claims. (Cl. 201—63)

This invention relates to a novel device for the measurement of the temperature of gases.

The invention is particularly adapted for the measurement of the temperature of gases having extremely high temperatures and velocities, such as those generally encountered in the exhausts of jet engines, turbines or the like. Similar devices of the prior art have been used to measure the temperature of a gas, but these have generally been confined to relatively low temperature ranges, and have been subject to many errors.

The present invention is designed to overcome those problems generally encountered in the accurate measurement of high temperatures and high velocities of gases, such as the shielding of the sensitive element to limit radiation from itself to the relatively cool walls of the gas chamber. Additional error has been introduced by the oxidation and corrosion of the sensitive element, which seriously altered its calibration. Another source of error has been due to the time lag inherent in the response of the temperature sensitive element due to its own heat capacity. Previous devices also involved structural difficulty, because of the shock upon the structure supporting the sensitive element, caused by the wide range and high speed temperature cycles which resulted in too rapid expansion and contraction of the structural components. It is, therefore, one of the objects of the present invention to provide novel means for measuring the temperature of a gas, whereby the foregoing sources of error are eliminated.

Another object of the invention is to provide a novel device for the temperature measurement of a gas, which will be accurate at extremely high temperatures.

Another object is to provide a novel device for measuring the temperature of high temperature gases, which will respond rapidly with no appreciable lag during changes in temperature of the gas under measurement.

A further object of this invention is to provide a novel device for measuring the temperature of high temperature gases, wherein the structure supporting the sensitive measuring element will be capable of withstanding the thermal shock and sustain the resultant high tensile stresses developed.

Still another object of the invention is to provide a novel device for measuring the temperatures of high temperature gases, which will be impervious to oxidation and chemical corrosion.

A still further object of the invention is to provide a novel device for measuring the temperature of high temperature and high velocity gases, wherein the radiation losses from the temperature sensitive element will be greatly reduced.

Still another object of this invention is to provide a novel device responsive to changes in the temperature of a gas, which may be readily applied to govern temperature control systems.

The foregoing and other objects and advantages will appear more fully hereinafter from a consideration of the detailed description which follows, taken together with the accompanying drawing, wherein one embodiment of the invention is illustrated by way of example. It is to be expressly understood, however, that the drawing is for illustration purposes only and is not to be construed as defining the limits of the invention.

In the drawing, wherein like reference characters refer to like parts in the several views:

Fig. 1 is a longitudinal cross-section of one form of high temperature measuring device embodying the invention, and shows the device applied, by way of example, to a jet engine for measuring the temperature of the exhaust gases.

Fig. 2 is an electrical circuit diagram showing one application of the device of Fig. 1 for governing a temperature control system.

Fig. 3 is an enlarged view of a typical support for the resistance element of the device shown in Fig. 1.

Referring now to the drawing, and more particularly to Fig. 1, one form of device embodying the invention comprises a resistance element 5 of small diameter wire welded to larger diameter wires or leads 6 which are connected to terminal posts 7 mounted on a ceramic terminal block 8 provided with a number of apertures 9 to allow the gas to escape therefrom. The resistance element 5 is inserted in a molybdenum sampling tube 10 having an end opening 10A, and is held in said tube by ceramic supports 11 which, as shown in Fig. 3, are suitably cut out to permit passage of the gas therethrough. The tube 10 is coated with a multi-layer ceramic 12 and is attached to a high-temperature-alloy flange 13 which, in turn, attaches to wall 14 of a combustion chamber which may be the combustion chamber of a jet engine.

It will now be apparent that the high temperature gases entering the device through the opening 10A of tube 10 will flow across the temperature sensitive wire 5 and through the supports 11 at a relatively high velocity before escaping through apertures 9. This high velocity flow will reduce the lag factor to a minimum, and there will be almost no radiation losses from the temperature sensitive element 5 to the walls of the sampling tube 10 because the tube is inserted into the combustion chamber and assumes a temperature close to that of the gas therein. The tube 10 is constructed of a metal having high tensile strength at high temperatures, such as molybdenum. The multi-layer ceramic coating 12 is composed essentially of glass of high silicon content, and renders the molybdenum tube 10 impervious to oxidation. The resistance element 5 is made of a corrosion resistant metal, with an exceptionally high melting point, such as iridium. It has been found that metals of the platinum group such as iridium, osmium, ruthenium, platinum, palladium and rhodium, possess excellent corrosion resistant properties, iridium, however, appears to be the most adaptable for the purpose because of its extremely high melting point and because of its high tensile strength. Since the pressure within the combustion chamber is always higher than outside pressure, a steady flow of gas will be maintained along the element 5. For stagnant gas temperature measurement some device common to the art such as an aspirator may be adapted to maintain flow. The temperature of element 5, therefore, will change as the gas temperature changes. This will alter the electrical resistance of element 5 and said change in resistance may be measured to indicate the temperature of the gas.

Referring now to Fig. 2, there is illustrated one application of the instant invention, wherein the device is shown associated with an electrical circuit of a temperature control system which may, for example, be utilized to govern the amount of fuel supplied to a jet engine in response to the temperature of the exhaust gases thereof. In this embodiment, 5 is the resistance element, 17 is a fixed resistance, and 18 an A. C. current source connected across the bridge formed by element 5, resistance 17, and the balancing potentiometer 19. The primary 21 of transformer 20 forms part of the circuit. The secondary 22 of transformer 20 is connected to amplifier 23 which in turn feeds power to motor 24. It is now apparent that a change in the resistance of element 5 due to a change in gas temperature, will unbalance the bridge and will change the value of the power transmitted from primary 21 to secondary 22 and to amplifier 23. This in turn will operate the motor 24, and this ultimate effect being proportional to the change in resistance of element 5, caused by the change in temperature of the gas under measurement may be used in the operation of a temperature control system of the type above set forth.

From the foregoing, it will be evident that there is thus provided a novel device for the temperature measuring of gases, adaptable to measure the temperature of extremely high velocity and high temperature gases, wherein the radiation losses conducive to error are substantially eliminated; which will be free from corrosion; structurally adequate to withstand the thermal shock; and which may be applied to govern temperature control systems.

Although only one embodiment and one application of the invention have been illustrated and described, other changes and modifications in the form and relative arrangements of parts which will be apparent to those skilled in the art may be made without departing from the spirit and scope of the invention.

What is claimed is:

1. A probe for use in an electrical circuit for sensing the temperature of gases having high temperatures and velocities, comprising a corrosion resistant tube, a temperature sensing element encompassed by said tube, a plurality of ceramic supports for said element within said tube, a ceramic block closing one end of said tube and having a plurality of apertures therein for permitting the flow of gas through said tube and block and over said element when the open end of said tube is placed in communication with a region containing a gas the temperature of which is to be sensed, and means carried by the ceramic block for connecting said element into the temperature sensitive circuit.

2. A probe for use in an electrical circuit for sensing the temperature of gases having high temperatures and velocities, comprising a temperature sensitive element, a heat and corrosion resistant tube encompassing said element, a ceramic block on one end of said tube, electrical connections carried by said ceramic block for supporting said element in said tube and connecting said element into the circuit, a plurality of ceramic supports in said tube for supporting the element therein, and a high temperature alloy flange for mounting said tube, said ceramic block having a plurality of ports therethrough so that gas will be permitted to flow along said element when the opposite end of said tube is placed in communication with a region containing a gas the temperature of which is to be sensed.

3. A probe for use in an electrical resistance measuring circuit for measuring the temperature of a gas, comprising a molybdenum tube, a ceramic coating protecting said tube, a high temperature alloy flange forming the base of said tube, a resistance element made of a metal of the platinum group within said tube, a ceramic block closing one end of said tube, a plurality of terminal posts and leads carried by said ceramic block for connecting said resistance element into the resistance measuring circuit, and a plurality of perforated ceramic supports for supporting said resistance element in said tube, said ceramic block having a plurality of radial ports communicating with the interior of said tube to permit gas to flow through the open end of said tube and escape therefrom through said ports when said open end of the tube is communicating with a gas the temperature of which is to be measured.

4. A probe for use in an electrical resistance measuring circuit for measuring the temperature of high temperature gases, comprising a molybdenum tube, a ceramic coating protecting said tube, a high temperature alloy flange forming the base of said tube, an iridium resistance element within said tube, a plurality of perforated ceramic supports holding said resistance element within said tube, a ceramic block closing one end of said tube and having radial ports opening into the interior of said tube to permit gas to flow through said tube and escape through said ports when the open end of said tube is communicating with a region containing a gas the temperature of which is to be measured, and electrical connections carried by said ceramic block for connecting said resistance element into the electrical resistance measuring circuit.

5. A housing for a temperature sensitive element of an electrical circuit, comprising a ceramic covered metallic tube adapted to enclose said temperature sensitive element, a ceramic block closing one end of said tube and having electrical connections thereon for connecting said element into an electrical circuit, ceramic supports in said tube for supporting said element within said tube, said block and supports having apertures formed therein whereby gas will flow through said tube and block and over said element when the open end of said tube is placed in communication with a region containing a gas the temperature of which is to be measured.

6. A housing for a temperature sensitive element of an electrical circuit for measuring the temperature of a high temperature gas stream, comprising a tube for enclosing said temperature sensitive element, and a ceramic block closing one end of said tube and having electrical connections thereon for connecting said element into said temperature measuring circuit and a plurality of apertures formed therein whereby gas is permitted to flow over said element when the open end of said tube is placed in communication with the stream of gas the temperature of which is to be measured.

7. A base for a temperature sensitive element of an electrical temperature measuring circuit, comprising a ceramic block having electrical connections thereon for connecting said element into the temperature measuring circuit, and apertures therethrough for permitting gas to flow by said element when said base is mounted on one end of a tube with said element extending into said tube and the other end of said tube is communicating with a region containing a gas the temperature of which is to be measured.

8. A base for the resistance element of a resistance measuring circuit, comprising a ceramic block, electrical connections on said block for supporting said resistance element and for connecting said resistance element into the resistance measuring circuit, said block being provided with apertures for permitting gas to flow therethrough and over said resistance element when said base is mounted to one end of a tube with said resistance element extending into said tube and the other end of said tube is communicating with a region containing a gas the temperature of which is to be measured.

WILLIAM R. POLYE.

REFERENCES CITED

The following references are of record in the file of this patent:

UNITED STATES PATENTS

| Number | Name | Date |
|---|---|---|
| 1,615,503 | Brown | Jan. 25, 1927 |
| 1,665,397 | Wunsch | Apr. 10, 1928 |
| 2,270,991 | Bagno | Jan. 27, 1942 |

FOREIGN PATENTS

| Number | Country | Date |
|---|---|---|
| 573,361 | Great Britain | Nov. 16, 1945 |

OTHER REFERENCES

"Publication #1048," Feb. 1, 1948 (Description of Electronic Temperature Control-Model 191, published by the Instrument Division of Thomas A. Edison, Inc., West Orange, New Jersey; five pages, page 4 of interest).